(12) United States Patent
Robinson et al.

(10) Patent No.: US 7,244,780 B1
(45) Date of Patent: Jul. 17, 2007

(54) POWDER COATING COMPOSITIONS

(75) Inventors: Janice Greta Robinson, Tyne & Wear (GB); Michael Wittig, Darmstadt (DE)

(73) Assignee: International Coatings Limited, London (GB)

( * ) Notice: Subject to any disclaimer, the term of this patent is extended or adjusted under 35 U.S.C. 154(b) by 0 days.

(21) Appl. No.: 09/807,540

(22) PCT Filed: Oct. 14, 1999

(86) PCT No.: PCT/GB99/03403

§ 371 (c)(1),
(2), (4) Date: Jul. 2, 2001

(87) PCT Pub. No.: WO00/22053

PCT Pub. Date: Apr. 20, 2000

(30) Foreign Application Priority Data

Oct. 15, 1998 (GB) .................................. 9822527.9

(51) Int. Cl.
*C08K 3/08* (2006.01)
(52) U.S. Cl. ...................... 524/441; 524/439; 524/440; 524/442; 524/444
(58) Field of Classification Search ................ 523/171, 523/200, 205, 209, 210, 216; 524/439, 440, 524/441, 442, 444
See application file for complete search history.

(56) References Cited

U.S. PATENT DOCUMENTS

| 4,687,595 A | 8/1987 | Howes et al. |
| 4,710,404 A * | 12/1987 | Reichert et al. ............ 427/386 |
| 5,030,285 A | 7/1991 | Vallvey et al. |
| 5,126,074 A | 6/1992 | Bittner |
| 5,137,567 A | 8/1992 | Aubareda Vallvey et al. |
| 5,332,767 A | 7/1994 | Reisser et al. |
| 5,338,348 A | 8/1994 | Savin |
| 5,656,074 A | 8/1997 | Collier et al. |
| 5,667,367 A | 9/1997 | Kubo et al. |

FOREIGN PATENT DOCUMENTS

| EP | 0 046 057 | 2/1982 |
| EP | 0 273 698 | 7/1988 |
| EP | 0 360 422 | 3/1990 |
| EP | 0 477 433 | 4/1992 |
| EP | 0 486 476 | 5/1992 |
| EP | 0 525 870 | 2/1993 |
| GB | 1 485 388 | 9/1977 |
| GB | 2 121 419 | 12/1983 |
| GB | 2 302 092 | 1/1997 |
| GB | 2302092 | * 1/1997 |
| WO | 91/18951 | 12/1991 |
| WO | 94/11446 | 5/1994 |
| WO | 96/38505 | 12/1996 |

\* cited by examiner

*Primary Examiner*—Edward J. Cain
(74) *Attorney, Agent, or Firm*—Kenyon & Kenyon LLP

(57) ABSTRACT

Powder coating compositions comprise a film-forming polymer, a pigment providing a metallic effect, and a stabilizing additive which, in a coating formed from the composition on a substrate, inhibits degradation of the metallic pigment in the presence of oxygen and water.

54 Claims, No Drawings

POWDER COATING COMPOSITIONS

This invention relates to powder coating compositions, and in particular to powder coating compositions which incorporate pigments providing metallic effects.

Powder coatings form a rapidly growing sector of the coatings market. Powder coatings are solid compositions which are generally applied by an electrostatic spray process in which the powder coating particles are electrostatically charged by the spray gun and the substrate is earthed. Charging of the powder in the spray gun is effected by means of an applied voltage or by the use of friction (tribo-charging). Conversion of the adherent particles into a continuous coating (including, where appropriate, curing of the applied composition) may be effected by heat treatment and/or by radiant energy, notably infra-red, ultra-violet or electron beam radiation. The powder coating particles which do not adhere to the substrate can be recovered for re-use so that powder coatings are economical in use of ingredients. Also, powder coating compositions are generally free of added solvents, and, in particular, do not use organic solvents and are accordingly non-polluting.

Powder coating compositions generally comprise a solid film-forming resin binder, usually with one or more colouring agents such as pigments, and optionally also contain one or more performance additives. They are usually thermosetting, incorporating, for example, a film-forming polymer and a corresponding curing agent (which may itself be another film-forming polymer), but thermoplastic systems (based, for example, on polyamides) can in principle be used instead. Powder coating compositions are generally prepared by intimately mixing the ingredients (including colouring agents and performance additives) for example in an extruder, at a temperature above the softening point of the film-forming polymer(s) but below a temperature at which significant pre-reaction would occur. The extrudate is usually rolled into a flat sheet and comminuted, for example by grinding, to the desired particle size. Other homogenisation processes also come into consideration, including non-extruder-based processes such as, for example, processes involving mixing using supercritical fluids, especially carbon dioxide.

In coatings formed from compositions incorporating pigments providing metallic effects, generally the pigments are covered by a layer of the film-forming resin binder. Problems arise, however, if there is ingress of moisture and oxygen through that layer (which may in some cases be very thin or even non-existent) or if the film is damaged, because the resulting attack on the pigment leads to deterioration of the appearance of the film (blackening, darkening, dark spots, loss of gloss/brilliance, etc.). Current practice frequently involves the use of a clear coating applied separately over the metallic effect coating in order to provide further protection, and/or the use of metallic pigments bearing an inorganic or organic protective coating.

The present invention provides a powder coating composition which comprises a film-forming polymer, a pigment providing a metallic effect (hereinafter "metallic pigment"), and a stabilising additive which, in a coating formed from the composition on a substrate, inhibits degradation of the metallic pigment in the presence of oxygen and water.

It will be appreciated that oxidative attack on the metallic pigment may be brought about in the presence of atmospheric humidity and/or liquid water.

The metallic pigment is usually in flake form and may comprise aluminium or an aluminium alloy or another metal or alloy, for example, stainless steel, copper, tin, bronze or brass (gold is generally too expensive) and may be used to produce various metallic effects including those referred to as "lustre" or "glamour" finishes. Combinations of two or more different metallic pigments may be used.

The metallic pigment is advantageously aluminium or an alloy thereof, and either a "leafing" or a "non-leafing" system may be used. In a leafing system, the aluminium flakes orient themselves in a continuous layer at or near the surface of the applied coating film, producing an opaque silver finish. Non-leafing aluminium pigments, which orient themselves throughout the coating film, provide aesthetics quite unlike leafing aluminium pigments. They are unique in their ability to project "flop", polychromatic and sparkle effects. ("Flop" is the ability to change colour when viewed at different angles. This capability is directly related to flake orientation in the film.)

The metallic pigment(s) are usually incorporated in the powder coating composition after the extrusion or other homogenisation process (hereinafter "post-blended". One form of post-blending method comprises dry-blending and any available dry-blending incorporation method may be used, for example:

(i) injection at the mill, with the chip and additive(s) fed into the mill simultaneously;

(ii) introduction at the stage of sieving after milling; and (iii) post-production blending in a "tumbler" or other suitable mixing device.

Method (ii) or (iii) will generally be preferred, because the desired metallic effect provided, for example, by "leafing" of the pigment may easily be destroyed by strong shear forces. Similar considerations mean that it is not usually recommendable to incorporate the metallic pigment(s) before or during extrusion or other high-shear homogenisation process. The position is different, however, in the case of low-shear homogenisation processes, such as processes involving mixing using supercritical fluids, and in such cases some or all of the metallic pigment(s) may expediently be incorporated pre-homogenisation.

In principle, a proportion of the total content of metallic pigment(s) may be incorporated pre- and/or during the homogenisation process, with the remainder being incorporated post-homogenisation ("post-blending").

In post-blending, the metallic pigment may be incorporated by simple admixture or may be bonded to the powder coating particles, for example, by a mechanofusion technique in which individual flakes of metallic pigment are bonded to the surface of the powder coating particles. Thus, as soon as the powder begins to melt during stoving the metallic flakes are released and rise to the surface of the powder coating film, thereby producing a good leafing effect and a bright metallic finish. A further advantage of bonding the metallic pigment to the powder particles is the reduced tendency of the powder/pigment combination to segregate during electrostatic application. In a variant of this approach, the stabilising additive may be bonded to the powder particles simultaneously with the metallic pigment.

A range of hammer and other textured metallic finishes can be produced by using, in addition to the metallic pigment, an appropriate hammer or other structure additive.

The metallic pigment may be an uncoated or coated material. Examples of coated materials include pigments coated with silica or another inert inorganic material for greater chemical resistance and durability. Alternatively, the pigment may be coated with a plastics material for similar purposes, for example, an acrylic, PTFE or thermosetting plastics material, or may be carried in a polymer or plasticiser which is compatible with the film-forming binder of the powder coating composition. As a further possibility, the metallic pigment may be coated with a colouring agent such as a metal oxide pigment such as, for example, iron oxide, to provide special colour effects.

In principle, the metallic pigment may be pre-treated with the stabilising additive (for example, by a solution pre-treatment) so as to form a coating of the additive on the pigment.

An alternative process for introducing the metallic pigment and/or the stabilising additive and/or one or more other additives is the agglomeration technique disclosed in WO 91/18951. The product of that technique in the context of the present invention is a fused or bonded agglomerate of different particulate components comprising a primary film-forming component and one or more other components (pigments and/or other additives).

The total proportion of metallic pigment(s) incorporated in the powder coating composition by post-blending may be in the range of from 0.1 to 10% by weight (based on the weight of the composition without the metallic pigment(s)), for example, from 0.4 to 8% by weight, preferably from 0.1 to 5% by weight, typically from 1 to 4% by weight.

In the case of incorporation before and/or during homogenisation, especially in the case of low-shear (non-extruder-based) homogenisation processes, the total content of metallic pigment(s) incorporated may be in the range of from 0.1–50% by weight, based on the total weight of the composition, preferably at least 5% or 10% by weight, advantageously not exceeding 30% by weight, for example, 5 to 30% or 10 to 30% by weight.

In one form of powder coating composition according to the invention, the stabilising additive comprises at least one silicate material selected from the group consisting of:
  (a) materials obtainable by admixture or, preferably, reaction of silica or a silicate with a compound of a trivalent metal; and
  (b) naturally occurring or synthetic metal silicates.

Advantageously, the stabilising additive also includes an oxide selected from zinc oxide, magnesium oxide or silica, preferably zinc oxide, which may be incorporated in an amount in the range of from 2 to 30% by weight, based on the total weight of the stabilising additive, advantageously at least 5%, 10% or 15% by weight, more especially not exceeding 20% or 25% by weight.

The preferred trivalent metal in embodiment (a) is chromium, iron or aluminium, especially aluminium. Embodiment (b) advantageously uses a silicate of a trivalent metal, and the same preferences apply.

The compound of the trivalent metal may, for example, be a phosphate (preferably a mono- or di-hydrogen phosphate), a fluoride, silicofluoride, chloride, sulphate or alkane carboxylate. Aluminium phosphates or sulphate are preferred.

The silica in embodiment (a) is advantageously amorphous silica or a precursor thereof.

Examples of naturally occurring metal silicates for use in embodiment (b) are china clay and bentonite.

As an indication of the relative proportions of silica and trivalent metal compound in embodiment (a), the ratio of silicon to trivalent metal atom may be, for example, 1.5 to 30:1, advantageously at least 1.5:1, 2.5:1 or 3.5:1, preferably not exceeding 20:1, 15:1 or 10:1. In general, the same silicon: metal ratios are also applicable to embodiment (b), especially in the case where the metal silicate is a silicate of a trivalent metal.

The term "silica" as used herein includes materials obtained by pyrogenic and, preferably, wet processes leading to precipitated silicas or silica gels, as well as, in principle, mixed metal-silicon oxides and naturally-occurring materials such as, for example, diatomaceous earth. Silicas for use according to the invention will in general have an amorphous structure. The term "silica" includes silicic acid materials and other precursor materials. Colloidal silica and fumed silica may be mentioned as examples of suitable silica materials.

A silicate material used as stabilising additive may be surface-modified by ion exchange. Examples of cations which may be incorporated at the surface of the silicate material by ion exchange include calcium, zinc, cobalt, lead, strontium, lithium, barium and magnesium, especially calcium.

Further, the stabilising additive may comprise, or be derived from, silica or alumina which has been surface-modified by ion exchange as described above, preferably in combination with zinc oxide. Further information concerning such surface-modified materials may be found in U.S. Pat. No. 4,687,595 and EP 0 046 057A. Examples of calcium-modified silica pigments include those supplied as corrosion-inhibiting additives under the trade name SHIELDEX (Grace) which are based on calcium ion-exchanged amorphous silica gel. Optionally, such materials may be used in combination with sulphur-containing organic compounds having fused aromatic and heterocyclic rings according to GB 2 302 092A.

As indicated below, a range of other materials supplied as corrosion-inhibiting additives (i.e., as materials for use in inhibiting corrosion of coated metal articles) may in principle be used as stabilising additives in accordance with the present invention. Thus, for example, suitable materials for use as stabilising additives in accordance with the invention include the non-toxic pigments supplied as anti-corrosive additives under the trade name ALBRITECT (Albright & Wilson), especially the CC 300 and CC 500 materials. Further information concerning additive materials which may be used may be found in EP 0 273 698A, EP 0 360 422A, and EP 0 486 476A.

Other classes of materials which may be used as stabilising additive include materials based on or comprising phosphates or borates, generally a metal phosphate or borate. A phosphate is preferably an ortho-phosphate, but may also be a hydrogen phosphate or a polyphosphate.

Thus, for instance, another stabilising additive which may be used comprises dicalcium phosphate dihydrate, for example, the material "Budit 222" as supplied by Budenheim Chemische Fabrik, or the material "Caliment M" as supplied by Albright & Wilson. Particular mention may also be made of dimagnesium phosphate trihydrate, such as the materials "Budit 229" and "Budit 246" (Budenheim Chemische Fabrik).

The stabilising additive may be a zinc phosphate, for example:
  (a) Zinc phosphate di-or tetra-hydrate, preferably in the form of spheroidal particles as described in U.S. Pat. No. 5,137,567 (an example of zinc phosphate dihydrate being the material obtainable under the trade name DELAPHOS 2M and a further example of a zinc phosphate being the material obtainable under the trade name HISPAFOS SP, comprising spheric particles of narrow particle size distribution);
  (b) Spheroidal zinc phosphate as a crystalline phase in admixture with an amorphous phase comprising Fe(II)

phosphate and Fe(III) phosphate. Further information concerning such materials may be found in U.S. Pat. No. 5,030,285;

(c) zinc phosphate (preferably in spheroidal form) modified with zinc molybdate and rendered organophilic by suitable surface treatment. An example is the material Actirox 106 supplied by Microfine Minerals Ltd.

(d) zinc aluminium phosphate;

Further materials which come into consideration as stabilising additives include the following:

(i) alkaline earth hydrogen phosphates in conjunction with alkaline earth carbonates, optionally also including one or more additives selected from fluorosilicates, fluoroborates, alkali and alkaline earth fluorides. Further information concerning such materials may be found in U.S. Pat. No. 5,126,074;

(ii) mixtures of magnesium hydrogen phosphate and calcium hydrogen phosphate;

(iii) polyphosphates and polyphosphate hydrates, including ammonium polyphosphates; modified strontium aluminium polyphosphate hydrates such as those obtainable under the trade names HEUCOPHOS SAPP and HEUCOPHOS SRPP; zinc aluminium polyphosphate hydrates such as those obtainable under the trade name HEUCOPHOS ZAPP; modified zinc calcium aluminium polyphosphate silicate hydrates such as those obtainable under the trade name HEUCOPHOS ZCPP; and modified calcium aluminium polyphosphate silicate hydrates such as those obtainable under the trade name HEUCOPHOS CAPP;

(iv) orthophosphate hydrates including modified zinc calcium strontium orthophosphate silicate hydrates such as those obtainable under the trade name HEUCOPHOS ZCP; modified zinc aluminium orthophosphate hydrates such as those obtainable under the trade name HEUCOPHOS ZPA; organically treated basic zinc orthophosphate hydrates such as those obtainable under the trade name HEUCOPHOS ZPO; modified basic zinc molybdenum orthophosphate hydrates such as those obtainable under the trade name HEUCOPHOS ZMP and organic/inorganic modified basic zinc orthophosphate or basic zinc phosphate silicate hydrates such as those obtainable under the trade names HEUCOPHOS ZPZ and ZBZ, respectively;

(v) phosphosilicates such as, for example, calcium strontium zinc phosphosilicate (such as the material obtainable under the trade name Halox SZP391 from Halox Pigments), calcium phosphosilicate, and zinc aluminium phosphosilicate;

(vi) organophosphonates including metal organophosphonates such as, for example, salts of a polyvalent metal cation and an organic phosphonic acid containing at least two phosphonic acid groups, for instance, calcium etidronate (1-hydroxyethane-1,1-diphosphonic acid monocalcium dihydrate). Further information concerning such materials may be found in GB 2 121 419A.

(vii) barium metaborate monohydrate;

(viii) zinc salts of organic nitro compounds;

(ix) zinc oxide/cinnamic acid combinations; and (x) molybdates, including basic molybdates such as, for example, zinc molybdates such as the material obtainable under the trade name MOLYWHITE 101 (Sherwin Williams Chemicals) and calcium zinc molybdate complexes such as the material obtainable under the trade name MOLYWHITE 212 (Sherwin Williams), which comprises a calcium zinc molybdate complex on a core of calcium carbonate.

For safety and environmental reasons, the use of lead compounds, chromates or other toxic materials is not recommended.

The stabilising additive may be an organic or inorganic material; mention may be made of inorganic materials which are substantially free of material containing organic moieties.

As a further generalisation, although the stabilising mechanism is not fully understood, it is believed that preferred stabilising additives for use according to the present invention will comprise a source of stabilising anions, advantageously phosphate ions, capable of dissolving in the presence of water.

In this connection, it will be appreciated that the environment of an additive material in a powder coating film is very different from that in a dried paint film derived from a wet paint system. In particular, a powder coating film will in general be less porous than the dried film from a liquid paint and additive particles will accordingly be closely encapsulated by the film-forming binder. Taking these factors into consideration, it might have been expected that the particles of the stabilising additive would be "frozen" within the finished coating film, and that there would accordingly be insufficient stabilising material available to the metallic pigment particles for there to be any appreciable effect.

In contrast with the present invention, compositions have been proposed in the art in which elemental zinc is used in powder coating compositions to inhibit corrosion of metallic substrates (see U.S. Pat. No. 5,338,348 and U.S. Pat. No. 5,667,367), and such previously proposed compositions may also include silica-containing additives to provide additional corrosion protection for the substrate (see EP 0 525 870A). In such compositions, it will be appreciated that the zinc does not function as a pigment to provide an aesthetic metallic effect but as a sacrificial electrode which is corroded in preference to the metal substrate. The present invention is in general not concerned with compositions including elemental zinc as an electrochemical corrosion inhibitor for the substrate.

In principle, a combination of more than one stabilising additive may be used, provided that there is no undesirable interaction between them, but this is not necessary and the composition preferably comprises only a single stabilising additive.

Stabilising additives used according to the invention may be incorporated by intimate mixing with the other constituent(s) of the composition, excluding dry-blended additives, before the extrusion or other homogenisation process and/or may be incorporated during the process. Additionally or, preferably, alternatively, the additive(s) of the invention may be incorporated in the powder coating composition by any available post-blending method as described hereinbefore in relation to the incorporation of the metallic pigment(s).

Thus, for example, the stabilising additive(s) may be incorporated by a dry-blending method, for instance:

(i) injection at the mill, with the chip and additive(s) fed into the mill simultaneously;

(ii) introduction at the stage of sieving after milling; and (iii) post-production blending in a "tumbler" or other suitable mixing device.

Instead of incorporation by simple admixture as in dry-blending, the additive(s) may be bonded to the powder coating particles, for example, by a mechanofusion technique.

The individual components of a corrosion-inhibiting additive used according to the invention may be incorporated separately or pre-mixed prior to incorporation (whether pre-, during or post-extrusion or other homogenisation process), or, in the case of embodiment (a), the components may be pre-reacted before incorporation. By way of example, such pre-reaction may be carried out in aqueous solution or dispersion, suitably under acid conditions generated, for example, by incorporation of phosphoric acid, and the resulting precipitate may be washed and thereafter dried at elevated temperature (for example, 100° to 350° C.).

In principle, a proportion or component of the stabilising additive may be incorporated pre- and/or during the homogenisation process, with the remaining proportion or component being incorporated post-homogenisation.

The proportion of stabilising additive(s) incorporated in a powder coating composition of the invention pre- or during homogenisation may in general be in the range of from 0.5 to 50% by weight, based on the total weight of the composition, for example at least 1%, 5% or 10% by weight, for example not exceeding 30% or 40% by weight. Ranges which may be mentioned include from 10 to 30%, 5 to 20% or 5 to 15% by weight, for example from 8 to 12% by weight. The proportion of stabilising additive incorporated by post-blending will in general be significantly less to achieve equivalent or superior effects, thus providing an advantage for the post-blending method. Thus, for example, the proportion of stabilising additive incorporated by post-blending may be no more than 5% by weight based on the total weight of the composition although higher proportions (say, up to 6%, 7.5% or 10% by weight) may be used in some cases. The proportion of additive incorporated by dry blending will usually be at least 0.5% by weight, and preferably at least 1% by weight.

The particle size of the or each stabilising additive or component thereof may in general be up to 25 microns, and is preferably no more than 10 microns, especially in the case of thin-film applications. The preferred minimum particle size is 0.1 microns and a range of 2.5 to 7.5 microns may be mentioned as suitable.

The particle size of any zinc oxide included in the stabilising additive is advantageously in the range of from 0.1 to 10 microns.

The particle size distribution of the powder coating composition may be in the range of from 0 to 120 microns with a mean particle size in the range of from 15 to 75 microns, preferably at least 20 or 25 microns, advantageously not exceeding 50 microns, more especially 20 to 45 microns.

In the case of relatively fine size distributions, especially where relatively thin applied films are required, for example, the powder coating composition may be one in which one or more of the following criteria is satisfied:
a) 95–100% by volume <50 μm
b) 90–100% by volume <40 μm
c) 45–100% by volume <20 μm
d) 5–100% by volume <10 μm preferably 10–70% by volume <10 μm
e) 1–80% by volume <5 μm preferably 3–40% by volume <5 μm
f) $d(v)_{50}$ in the range 1.3–32 μm preferably 8–24 μm A powder coating composition according to the invention may contain a single film-forming powder component comprising one or more film-forming resins or may comprise a mixture of two or more such components.

The film-forming resin (polymer) acts as a binder, having the capability of wetting pigments and providing cohesive strength between pigment particles and of wetting or binding to the substrate, and melts and flows in the curing/stoving process after application to the substrate to form a homogeneous film.

The or each powder coating component of a composition of the invention will in general be a thermosetting system, although thermoplastic systems (based, for example, on polyamides) can in principle be used instead.

When a thermosetting resin is used, the solid polymeric binder system generally includes a solid curing agent for the thermosetting resin; alternatively two co-reactive film-forming thermosetting resins may be used.

The film-forming polymer used in the manufacture of the or each component of a thermosetting powder coating composition according to the invention may be one or more selected from carboxy-functional polyester resins, hydroxy-functional polyester resins, epoxy resins, and functional acrylic resins.

A powder coating component of the composition can, for example, be based on a solid polymeric binder system comprising a carboxy-functional polyester film-forming resin used with a polyepoxide curing agent. Such carboxy-functional polyester systems are currently the most widely used powder coatings materials. The polyester generally has an acid value in the range 10–100, a number average molecular weight Mn of 1,500 to 10,000 and a glass transition temperature Tg of from 30° C. to 85° C., preferably at least 40° C. The poly-epoxide can, for example, be a low molecular weight epoxy compound such as triglycidyl isocyanurate (TGIC), a compound such as diglycidyl terephthalate condensed glycidyl ether of bisphenol A or a light-stable epoxy resin. Such a carboxy-functional polyester film-forming resin can alternatively be used with a bis(beta-hydroxyalkylamide) curing agent such as tetrakis(2-hydroxyethyl) adipamide.

Alternatively, a hydroxy-functional polyester can be used with a blocked isocyanate-functional curing agent or an amine-formaldehyde condensate such as, for example, a melamine resin, a urea-formaldehyde resin, or a glycol ural formaldehyde resin, for example the material "Powderlink 1174" supplied by the Cyanamid Company, or hexahydroxymethyl melamine. A blocked isocyanate curing agent for a hydroxy-functional polyester may, for example, be internally blocked, such as the uretdione type, or may be of the caprolactam-blocked type, for example isophorone diisocyanate.

As a further possibility, an epoxy resin can be used with an amine-functional curing agent such as, for example, dicyandiamide. Instead of an amine-functional curing agent for an epoxy resin, a phenolic material may be used, preferably a material formed by reaction of epichlorohydrin with an excess of bisphenol A (that is to say, a polyphenol made by adducting bisphenol A and an epoxy resin). A functional acrylic resin, for example a carboxy-, hydroxy- or epoxy-functional resin can be used with an appropriate curing agent.

Mixtures of film-forming polymers can be used, for example a carboxy-functional polyester can be used with a carboxy-functional acrylic resin and a curing agent such as a bis(beta-hydroxyalkylamide) which serves to cure both polymers. As further possibilities, for mixed binder systems, a carboxy-, hydroxy- or epoxy-functional acrylic resin may be used with an epoxy resin or a polyester resin (carboxy- or hydroxy-functional). Such resin combinations may be selected so as to be co-curing, for example a carboxy-functional acrylic resin co-cured with an epoxy resin, or a carboxy-functional polyester co-cured with a glycidyl-functional acrylic resin. More usually, however, such mixed binder systems are formulated so as to be cured with a single curing agent (for example, use of a blocked isocyanate to cure a hydroxy-functional acrylic resin and a hydroxy-functional polyester). Another preferred formulation involves the use of a different curing agent for each binder of a mixture of two polymeric binders (for example, an amine-cured epoxy resin used in conjunction with a blocked isocyanate-cured hydroxy-functional acrylic resin).

Other film-forming polymers which may be mentioned include functional fluoropolymers, functional fluorochloropolymers and functional fluoroacrylic polymers, each of which may be hydroxy-functional or carboxy-functional, and may be used as the sole film-forming polymer or in conjunction with one or more functional acrylic, polyester and/or epoxy resins, with appropriate curing agents for the functional polymers.

Other curing agents which may be mentioned include epoxy phenol novolacs and epoxy cresol novolacs; isocyanate curing agents blocked with oximes, such as isopherone diisocyanate blocked with methyl ethyl ketoxime, tetramethylene xylene diisocyanate blocked with acetone oxime, and Desmodur W (dicyclohexylmethane diisocyanate curing agent) blocked with methyl ethyl ketoxime; light-stable epoxy resins such as "Santolink LSE 120" supplied by Monsanto; and alicyclic poly-epoxides such as "EHPE-3150" supplied by Daicel.

Certain alloys, especially certain aluminium alloys (including alloys used in aerospace applications) undergo metallurgical changes at temperatures of the order of 150° C. and above. Accordingly, an important embodiment of the invention comprises so-called "low-bake" compositions formulated so as to be convertible into continuous coating form (with curing as appropriate) at temperatures not exceeding 150° C., advantageously not exceeding 140° C. and preferably not exceeding 130° C.

A powder coating composition for use according to the invention may be free from added colouring agents, but usually contains one or more such agents (pigments or dyes). Examples of pigments which can be used are inorganic pigments such as titanium dioxide, red and yellow iron oxides, chrome pigments and carbon black and organic pigments such as, for example, phthalocyanine, azo, anthraquinone, thioindigo, isodibenzanthrone, triphendioxane and quinacridone pigments, vat dye pigments and lakes of acid, basic and mordant dyestuffs. Dyes can be used instead of or as well as pigments.

The composition of the invention may also include one or more extenders or fillers, which may be used inter alia to assist opacity, whilst minimising costs, or more generally as a diluent.

The following ranges should be mentioned for the total pigment/filler/extender content of a powder coating composition according to the invention (disregarding post-blend additives):

0% to 55% by weight,
0% to 50% by weight,
10% to 50% by weight,
0% to 45% by weight, and
25% to 45% by weight Of the total pigment/filler/extender content, a pigment content of ≦40% by weight of the total composition (disregarding post-blend additives) may be used. Usually a pigment content of 25–30% is used, although in the case of dark colours opacity can be obtained with <10% by weight of pigment.

The composition of the invention may also include one or more performance additives, for example, a flow-promoting agent, a plasticiser, a stabiliser against UV degradation, or an anti-gassing agent, such as benzoin, or two or more such additives may be used. The following ranges should be mentioned for the total performance additive content of a powder coating composition according to the invention (disregarding post-blend additives):

0% to 5% by weight,
0% to 3% by weight, and
1% to 2% by weight.

In general, colouring agents, fillers/extenders and performance additives as described above will not be incorporated by post-blending, but will be incorporated before and/or during the extrusion or other homogenisation process.

A powder coating composition according to the invention may in principle be applied to a substrate by any of the processes of powder coating technology, for example, by electrostatic spray coating (corona-charging or tribo-charging); or by fluidised-bed or electrostatic fluidised-bed processes.

After application of the powder coating composition to a substrate, conversion of the resulting adherent particles into a continuous coating (including, where appropriate, curing of the applied composition) may be effected by heat treatment and/or by radiant energy, notably infra-red, ultra-violet or electron beam radiation.

The powder is usually cured on the substrate by the application of heat (the process of stoving); the powder particles melt and flow and a film is formed. The curing times and temperatures are interdependent in accordance with the composition formulation that is used, and the following typical ranges may be mentioned:

| Temperature/° C. | Time |
| --- | --- |
| 280 to 100* | 10 s to 40 min |
| 250 to 150 | 15 s to 30 min |
| 220 to 160 | 5 min to 20 min |

*Temperatures down to 90° C. may be used for some resins, especially certain epoxy resins.

The present invention offers the possibility of avoiding the need for an additional protective coating applied as a barrier layer over the metallic effect coating, and the invention accordingly also provides a coating process in which the metallic effect coating is the topcoat and no further coating is applied thereto.

The invention is applicable over a wide range of applied film thicknesses, typically from thin films of, for example, 30 microns or less up to films of 50, 100, 150 or 200 microns. A typical minimum film thickness is 5 microns, and ranges of 15 to 25 microns and 15 to 40 microns are important.

A powder coating composition of the invention may incorporate, by dry-blending, one or more fluidity-assisting additives, for example, those disclosed in WO 94/11446, and especially the preferred additive combination disclosed in that Specification, comprising aluminium oxide and aluminium hydroxide, typically in proportions in the range of from 1:99 to 99:1 by weight, advantageously from 10:90 to 90:10, preferably from 30:70 to 70:30, for example, from 45:55 to 55:45. The use of such additive combinations is especially applicable in the case of relatively fine size distributions as described above, where relatively thin applied films are required. Other dry-blended additives which may be mentioned include aluminium oxide and silica (which may be a wax-coated silica) either singly or in combination with each other or in other additive combinations, for example, including aluminium hydroxide.

A preferred combination comprises wax-coated silica, aluminium oxide and aluminium hydroxide. In the case of additives comprising or consisting of aluminium oxide and/or aluminium hydroxide, preference may be given to γ-structural types.

The amount of fluidity-assisting additive(s) incorporated by dry blending may be in the range of from, for example, 0.05 or 0.1 to 5% by weight, based on the total weight of the composition without the additive(s), advantageously from 0.1 to 3% by weight, more especially 0.1 to 2% by weight, preferably at least 0.2% by weight, especially from 0.2 to 1.5% by weight, more especially 0.3 to 1% by weight.

The total content of non-film-forming additive(s) incorporated by post-blending will in general be no more than 10% by weight, based on the total weight of the composition without the additive(s).

The substrate may, for example, comprise aluminium, iron, tin or zinc. Alternatively, the substrate may comprise alloys of one or more of those metals with themselves or with other metals such as, for example, copper, nickel and/or magnesium. The metal or alloy may be in the form of a layer on a substrate formed of another material, which may itself be another metal or alloy.

The substrate may instead comprise a non-metallic material such as a plastics material, wood, a wood-based product, glass, glass fibre or a composite, ceramic or textile material.

Advantageously, a metal substrate is chemically or mechanically cleaned prior to application of the composition, and is preferably subjected to chemical pre-treatment, for example with iron phosphate, zinc phosphate or chromate. Substrates other than metallic are in general pre-heated prior to application or, in the case of electrostatic spray application, are pre-treated with a material that will aid such application.

In a typical composition according to the invention, the proportion of film-forming polymer (and curing agent where appropriate) may be in the range of from 25 to 99.5% by weight, preferably from 40 to 98% by weight, with a proportion in the range of from 40 to 98% by weight, preferably from 50 to 90 or 95% by weight, being representative of compositions including colouring agents.

The following Examples illustrate the invention:

The stabilising additives used in the Examples were as follows:

| | |
|---|---|
| Albritect CC500: | (Albright & Wilson) a blend of an insoluble aluminium silicate with zinc oxide. |
| Actirox 106: | zinc phosphate (small, spherical particles) modified with zinc molybdate and rendered organophilic (Microfine Minerals Ltd.). |
| Budit 222: | dicalcium phosphate dihydrate (Budenheim Chemische Fabrik). |
| Budit 229: | dimagnesium phosphate trihydrate (Budenheim Chemische Fabrik). |
| Delaphos 2M: | zinc phosphate dihydrate. |
| Calcium etidronate: | 1-hydroxyethane-1,1-diphosphonic acid monocalcium dihydrate (Bardyke Chemicals). |
| Irgacor 252 LD: | (2-benzothiazolyl) succinic acid (Ciba Specialty Chemicals). |

EXAMPLE 1

A grey polyester powder coating composition was prepared according to the following formulation (parts by weight):

| | |
|---|---|
| Carboxy-functional polyester resin | 700 |
| Primid XL-552 | 30 |
| Polyvinyl butyral flow agent | 14 |
| Benzoin | 4 |
| Amine-modified wax lubricant | 8 |
| Anti-oxidant | 2 |
| Rutile titanium dioxide | 100 |
| Ultramarine blue 54 | 1.88 |
| Iron oxide black | 0.56 |
| Iron oxide red | 0.26 |
| Calcium carbonate extender | 120 |
| | 980.7 |

The ingredients were dry-mixed in a blender and fed into a twin-screw extruder operating at a temperature of 130° C. The extrudate was rolled flat on a chilled plate and broken into chip form (c. 1 cm mesh). 0.1% by weight of Acematt TS100, a silica flatting agent, was added to the chip as a dry-flow additive to aid milling. The resulting composition in chip form was ground in an impact mill to produce a powder coating composition having a particle size distribution within the following range (determined using a Malvern Mastersizer X):

$d(v)_{99}$=103–108 μm $d(v)_{50}$=38–42 μm

7–8%<10 μm 1.4% by weight, calculated on the base powder without the metallic pigment, of leafing aluminium powder Special PC100 (from ECKART) was added to the powder coating composition prepared as described above. The aluminium pigment was dry-blended with the powder by shaking until it was evenly distributed throughout the powder, creating a metallic powder coating composition A.

A was divided into sub-samples. Powder coating compositions according to the invention were produced from several of these sub-samples by dry-blending, again by shaking, stabilising additives into the powder. The compositions of the additive-containing samples are given below (all quantities are percentages by weight, based on the metallic powder without the additive):

| | |
|---|---|
| A1 | composition A + 1% Albritect CC500 |
| A2 | A + 2% Albritect CC500 |
| A3 | A + 3% Albritect CC500 |
| A4 | A + 2% Actirox 106 |
| A5 | A + 3% Actirox 106 |
| A6 | A + 2% Budit 222 |
| A7 | A + 3% Budit 222 |

The compositions listed above were applied by electrostatic spray onto aluminium test panels. The powders were stoved at 200° for 8 minutes to produce cured metallic-effect films of thicknesses 50–80 μm.

Panels of the above cured coatings were placed in a humidity cabinet and subjected to condensing humidity under constant conditions, i.e., 100% RH and (40±3)° C., according to DIN 50017 (KK). More than one panel was exposed for some samples, because exposure conditions can vary in different areas of the humidity cabinet. At intervals the panels were inspected and the degree of attack rated according to the following scale:

0 = no effect
1 = isolated dark or discoloured spots
2 = numerous spots/slight loss of brilliance
3 = pronounced spots/loss of brilliance
4 = predominantly spotted/marked loss of brilliance
5 = complete destruction The results after various exposure durations are shown in the following table:

| Sample | Rating (duration) |
|---|---|
| A | 5 (50 hrs) |
| A1 | 4–5 (68 hrs) |
| A2 | 3 (68 hrs) |
| A3 | 1 (120 hrs) |
| A4 | 0–1 (120 hrs) |
| A5 | 0–1 (120 hrs) |
| A6 | 0 (120 hrs) |
| A7 | 0 (120 hrs) |

As can be seen, each of the additives improved the resistance of the metallic pigment to discolouration and loss of brilliance to some extent. Budit 222 and Actirox 106 produced marked improvements, with those films containing Budit 222 showing no signs of moisture and oxygen attack after 120 hours' exposure. A lesser degree of resistance was imparted by Albritect CC500. The latter, however, shows an increase in efficacy with rising levels of additive incorporation.

EXAMPLE 2

A grey polyester powder coating composition was prepared according to the following formulation (parts by weight):

| | |
|---|---|
| Carboxy-functional polyester resin | 800 |
| Primid XL-552 | 30 |
| Polyvinyl butyral flow agent | 16 |
| Benzoin | 4 |
| Amine-modified wax lubricant | 6 |
| Hindered amine light stabiliser | 4 |
| Rutile titanium dioxide | 75 |
| Iron oxide black | 8 |
| Iron oxide red | 0.46 |
| Iron oxide yellow | 0.84 |
| Blanc Fixe extender | 75 |
| | 1019.3 |

The ingredients were dry-mixed in a blender and fed into a twin-screw extruder operating at a temperature of 130° C. The extrudate was rolled flat on a chilled plate and broken into chip form (c. 1 cm mesh). The resulting composition in chip form was ground in an impact mill to produce powder coating compositions having a particle size distribution within the range described in Example 1.

3.5% by weight, calculated on the base powder without the metallic pigment, of non-leafing aluminium pigment Aluminiumstabil 7654 (Benda-Lutz) was added to the powder coating composition prepared as described above. The aluminium pigment was bonded to the powder by a mechanofusion technique, creating metallic powder coating composition B.

B was divided into sub-samples. Powder coating compositions according to the invention were produced from several of these sub-samples by dry-blending, by shaking, stabilising additives into the powder. The compositions of the additive-containing samples are given below (all quantities are percentages by weight, based on the metallic powder without the additive):

| | |
|---|---|
| B1 | composition B + 0.5% Albritect CC500 |
| B2 | B + 1% Albritect CC500 |
| B3 | B + 2% Albritect CC500 |
| B4 | B + 3% Budit 222 |

These compositions were applied by electrostatic spray onto aluminium test panels. The powders were stoved at 200° C. for 8 minutes to produce cured metallic-effect films of thicknesses 50–80 µm.

Panels of the above cured coatings were placed in a humidity cabinet and subjected to condensing humidity as described in Example 1. At intervals the panels were removed and the degree of attack rated according to the scale detailed in Example 1.

The results after various exposure durations are shown in the following table:

| Sample | Rating (duration) |
|---|---|
| B | 3 (48 hrs); 2 (120 hrs); 5 (144 hrs) |
| B1 | 2–3 (120 hrs) |
| B2 | 0 (68 hrs) |
| B3 | 0 (68 hrs) |
| B4 | 0 (240 hrs); 1–2 (720 hrs) |

As can be seen, Albritect CC500 again gave an increase in protection with rising level of incorporation, and was more effective at levels of 1% and greater. The improvement afforded by the addition of Albritect CC500 was greater than that observed with the dry-blended leafing pigment in Example 1. Budit 222 again gave a superior degree of protection, resisting severe attack for several weeks in condensing humidity.

EXAMPLE 3

A clear polyester powder coating composition was prepared according to the following formulation (parts by weight):

| | |
|---|---|
| Carboxy-functional polyester resin | 1000 |
| Primid XL-552 | 39 |
| Hydroxylated polyester flow aid | 50 |
| Benzoin | 4 |
| Grilonit V68/31 | 6 |
| Hindered amine light stabiliser | 2 |
| Anti-oxidant | 8 |
| Pigment violet 11 | 1.6 |
| | 1110.6 |

The ingredients were dry-mixed in a blender and fed into a twin-screw extruder operating at a temperature of 130° C. The extrudate was rolled flat on a chilled plate and broken into chip form (c. 1 cm mesh). The resulting composition in chip form was ground in an impact mill to produce powder coating compositions having a particle size distribution within the range described in Example 1.

1.1% by weight, calculated on the base powder without the metallic pigment, of leafing aluminium powder 1081 from (Benda-Lutz) added to the powder coating composition prepared as described above. The aluminium pigment was bonded to the powder by a mechanofusion technique, creating metallic powder coating composition C.

C was divided into sub-samples. Powder coating compositions according to the invention were produced from several of the sub-samples by dry-blending, by shaking, stabilising additives into the powder. The compositions of the additive-containing samples are given below (all quantities are percentages by weight, based on the metallic powder without the additive):

| | |
|---|---|
| C1 | composition C + 1% Albritect CC500 |
| C2 | C + 2% Albritect CC500 |
| C3 | C + 3% Budit 222 |

These compositions were applied by electrostatic spray onto aluminium test panels. The powders were stoved at 200° C. for 8 minutes to produce cured metallic-effect films of thicknesses 50–80 µm.

Panels of the above cured coatings were placed in a humidity cabinet and subjected to condensing humidity as described in Example 1. At intervals the panels were removed and the degree of attack rated according to the scale detailed in Example 1.

The results after various exposure durations are shown in the following table:

| Sample | Rating (duration) |
|---|---|
| C | 4 (48 hrs); 4–5 (120 hrs) |
| C1 | 4 (68 hrs) |
| C2 | 3 (68 hrs) |
| C3 | 1 (330 hrs) |

As can be seen, Albritect CC500 gave a small increase in protection with rising level of incorporation. Budit 222 however produced a markedly superior degree of protection, showing only slight attack after 330 hours' exposure to humidity and oxygen.

EXAMPLE 4

Additives Incorporated into Base Powder

Epoxy-polyester hybrid powder coating compositions D–H were prepared according to the formulations below (parts by weight). D is a control reference, (not in accordance with the invention) and E–H are compositions according to the invention incorporating stabilising additives.

| | D | E | F | G | H |
|---|---|---|---|---|---|
| Uralac 5173 polyester resin | 500 | 500 | 500 | 500 | 500 |
| Araldite GT6063 epoxy resin | 225 | 225 | 225 | 225 | 225 |
| Polyvinyl butyral flow aid | 16 | 16 | 16 | 16 | 16 |
| Carnauba wax | 6 | 6 | 6 | 6 | 6 |
| Benzoin | 4 | 4 | 4 | 4 | 4 |
| Calcium carbonate extender | 300 | — | — | — | — |

-continued

| | D | E | F | G | H |
|---|---|---|---|---|---|
| Albritect CC500 | — | 300 | — | — | — |
| Actirox 106 | — | — | 300 | — | 200 |
| Budit 222 | — | — | — | 300 | 100 |
| | 1051 | 1051 | 1051 | 1051 | 1051 |

The ingredients were dry-mixed in a blender and fed into a twin-screw extruder operating at a temperature of 120° C. The extrudate was rolled flat on a chilled plate and broken into chip form (c. 1 cm mesh). 0.2% by weight of alumina was added to the chip as a dry flow additive to aid milling. The resulting compositions in chip form were ground in an impact mill to produce powder coating compositions having a particle size distribution within the range described in Example 1.

1.4% by weight, calculated on the base powder without the metallic pigment, of leafing aluminium powder Special PC100 was added to each powder coating composition D–H. The aluminium pigment was dry-blended with each powder by shaking until it was evenly distributed throughout the powder.

The metallic powder coating compositions thus prepared were applied by electrostatic spray onto aluminium test panels. The powders were stoved at 200° C. for 8 minutes to produce cured metallic-effect films of thicknesses 50–80 µm.

Panels of the above cured coatings were placed in a humidity cabinet and subjected to condensing humidity as described in Example 1. At intervals the panels were removed and the degree of attack rated according to the scale detailed in Example 1.

The results after various exposure durations are shown in the following table:

| Powder composition (containing Al PC100) | Rating (duration) |
|---|---|
| D | 4 (24 hrs) |
| E | 4 (120 hrs) |
| F | 0 (120 hrs) |
| G | 0 (120 hrs) |
| H | 0 (120 hrs) |

As can be seen, an improvement in the resistance to degradation of the aluminium pigment is also afforded by the addition of stabilising additives to the base powder prior to extrusion, instead of post-blending into finished metallic powder. Incorporation of Albritect CC500 into the base powder gives a small improvement, extending the time taken to degrade to a given level. However the addition of Budit 222, Actirox 106 or a mixture of these two to the base powder yields a significantly larger improvement, showing no effect whatsoever of moisture and oxygen attack after 120 hours.

EXAMPLE 5

A clear polyester powder coating composition was prepared according to the following formulation (parts by weight):

| | |
|---|---:|
| Carboxy-functional polyester resin | 920 |
| Triglycidyl isocyanurate curing agent | 60 |
| Flow agent | 13.5 |
| Benzoin | 1.0 |
| Anti-oxidant | 5.5 |
| Pigment Violet 23 | 0.02 |
| | 1000.02 |

The ingredients were dry-mixed in a blender and fed into a twin-screw extruder operating at a temperature of 130° C. The extrudate was rolled flat on a chilled plate and broken into chip form (c. 1 cm mesh). 0.1% of Aerosil 200 was added as a dry flow additive to aid milling. The resulting composition in chip form was ground in an impact mill to produce a powder coating composition with a particle size distribution within the range described in Example 1.

6% by weight, calculated on the base powder without the metallic pigment, of leafing aluminium pigment Stabil 7611 (Benda-Lutz) was added to the powder coating prepared as described above. The aluminium pigment was bonded to the powder by a mechanofusion technique, creating metallic powder coating composition J.

J was divided into sub-samples. Powder coating compositions according to the invention were produced from each of these sub-samples by dry-blending, by shaking, stabilising additives into the powder. The compositions of the additive-containing samples are given below (all percentages by weight, based on the metallic powder without the additive):

| | |
|---|---|
| J1 | composition J + 3% Budit 222 |
| J2 | J + 3% zinc phosphate Delaphos 2M |
| J3 | J + 3% calcium etidronate |

These compositions were applied by electrostatic spray onto steel tin-plate test panels. The powders were stoved at 180° C. for 15 minutes to produce cured metallic-effect films of thicknesses 50–80 μm.

Panels of the above cured coatings were placed in a humidity cabinet and subjected to condensing humidity under conditions according to BS3900 Part F2 (100% relative humidity, temperature cycling continuously from 42° C. to 48° C. and back to 42° C. within 60±5 minutes).

At intervals the panels were removed and the degree of attack assessed and rated according to the scale detailed in Example 1.

The assessment results after various exposure durations are shown in the following table:

| | Ratings | | | |
|---|---|---|---|---|
| Time (hours) | J | J1 | J2 | J3 |
| 96 | 3 | 0 | 0–1 | 0 |
| 120 | 4–5 | 0–1 | 1 | 1 |
| 144 | 5 | 0–1 | 1 | 1–2 |
| 216 | 5 | 2 | 2 | 2 |
| 264 | 5 | 2 | 2 | 2 |
| 312 | 5 | 2 | 3 | 2 |
| 384 | 5 | 2–3 | 4 | 2 |

-continued

| | Ratings | | | |
|---|---|---|---|---|
| Time (hours) | J | J1 | J2 | J3 |
| 600 | 5 | 3 | — | 2–3 |
| 744 | 5 | 4 | — | 2–3 |

As can be seen from the assessment rating, samples J1–J3 show an improvement in the resistance to degradation of the aluminium pigment. The incorporation of calcium etidronate at 3% w/w results in slightly more overall darkening of the coating than does Budit 222 or Delaphos 2M but gives better resistance to the formation of unsightly dark spots.

EXAMPLE 6

A pigmented epoxy-polyester powder coating composition was prepared according to the following formulation (parts by weight):

| | |
|---|---:|
| Carboxy-functional polyester resin | 277.2 |
| Epoxy resin | 69.3 |
| Titanium dioxide pigment | 52.0 |
| Barytes | 277.2 |
| Extender | 221.8 |
| Benzoin | 1.7 |
| Polyethylene wax | 1.7 |
| Catalyst masterbatch | 27.7 |
| Flow aid masterbatch in epoxy resin | 69.3 |
| | 997.9 |

The ingredients were dry-mixed in a blender and fed into a twin-screw extruder operating at a temperature of 120° C. The extrudate was rolled flat on a chilled plate and broken into chip form (c. 1 cm mesh). 2.1% of Acematt TS100, a silica flatting agent, was added as a dry flow additive to aid milling. The resulting composition in chip form was ground in an impact mill to produce a powder coating composition having a particle size distribution within the range described in Example 1.

1.6% by weight, calculated on the base powder without the metallic pigment, of leafing aluminium powder 2050 (Benda-Lutz) was added to the powder coating prepared as described above. The aluminium pigment was bonded to the powder by a mechanofusion technique, creating metallic powder coating composition K.

In addition, a further metallic powder coating composition L was prepared exactly as for composition C in Example 3.

K and L were divided into sub-samples. Powder coating compositions according to the invention were produced from each of these sub-samples by dry-blending, by shaking, stabilising additives into the powder. The compositions of the additive-containing samples are given below (all percentages by weight, based on the metallic powder without the additive):

| | |
|---|---|
| K1 | composition K + 3% Budit 222 |
| K2 | K + 6% Budit 222 |
| K3 | K + 3% Budit 229 |
| L1 | composition L + 3% Budit 222 |

-continued

| | |
|---|---|
| L2 | L + 6% Budit 222 |
| L3 | L + 3% Budit 229 |

These compositions were applied by electrostatic spray onto steel tin-plate test panels. The powders were stoved at 180° C. for 15 minutes to produce cured metallic effect films of thicknesses 50–80 µm.

Panels of the above cured coatings were placed in a humidity cabinet and subjected to condensing humidity under conditions according to BS3900 Part F2 as in Example 5. At intervals the panels were removed and the degree of attack assessed and rated according to the scale detailed in Example 1.

The rating results for K and K1–K3 after various exposure durations are shown in the following table:

| Time | Ratings | | | |
|---|---|---|---|---|
| (hours) | K | K1 | K2 | K3 |
| 48 | 5 | 1 | 0–1 | 0 |
| 120 | 5 | 1 | 0–1 | 0 |
| 264 | 5 | 1–2 | 1–2 | 0–1 |
| 336 | 5 | 2–3 | 1–2 | 0–1 |
| 408 | 5 | 4 | 2 | 0–1 |
| 456 | 5 | 5 | 2–3 | 1 |
| 576 | 5 | 5 | 3 | 1 |
| 672 | 5 | 5 | 3–4 | 1 |
| 768 | 5 | 5 | 4 | 1–2 |
| 840 | 5 | 5 | 4–5 | 2 |
| 1008 | 5 | 5 | 4–5 | 2–3 |
| 1272 | 5 | 5 | 5 | 3 |
| 1440 | 5 | — | — | 4–5 |

As can be seen from the assessment ratings, and bearing in mind that the BS3900 humidity exposure is an accelerated test procedure, each of samples K1–K3 shows an improvement in the resistance to degradation of the metallic powder coating. In addition, comparison of the results for K1 and K2 shows that the resistance to degradation is improved by increasing the level of Budit 222 incorporated into the powder from 3% to 6%. The incorporation of Budit 229 at 3% affords humidity resistance superior to that of samples K1 and K2, allowing composition K3 to withstand up to 1000 hours' exposure to humidity with relatively little degradation of the metallic finish.

The rating results for L and L1–L3 after various exposure durations are shown in the following table:

| Time | Ratings | | | |
|---|---|---|---|---|
| (hours) | L | L1 | L2 | L3 |
| 48 | 5 | 1 | 0–1 | 0–1 |
| 120 | 5 | 1 | 0–1 | 0–1 |
| 264 | 5 | 3 | 1 | 0–1 |
| 336 | 5 | 3 | 1–2 | 0–1 |
| 408 | 5 | 3–4 | 1–2 | 0–1 |
| 456 | 5 | 4 | 2 | 0–1 |
| 576 | 5 | 4 | 2 | 1 |
| 672 | 5 | 4–5 | 2 | 1 |
| 768 | 5 | 4–5 | 2 | 1 |
| 840 | 5 | 4–5 | 2–3 | 1 |
| 1008 | 5 | 4–5 | 3 | 1 |
| 1272 | 5 | 5 | 3 | 1 |
| 1440 | 5 | 5 | 3 | 1–2 |
| 1656 | 5 | — | 3–4 | 2 |

Each of samples L1–L3 shows an improvement in the resistance to degradation of the metallic powder coating. The resistance to degradation is again increased by raising the incorporation level of Bud it 222 from 3% to 6% but is improved still further by the addition of 3% Budit 229 instead of Budit 222. Sample L3 shows slightly increased darkening of the coating overall compared to L1 or L2, but its resistance to damage in the form of dark spots or patches is greatly improved. Sample L3 can withstand well over 1000 hours' exposure to humidity without significant impairment to the metallic finish.

EXAMPLE 7

A clear polyester powder coating composition was prepared according to the formulation listed in Example 5. The ingredients were dry-mixed in a blender and fed into a twin-screw extruder operating at a temperature of 130° C. The extrudate was rolled flat on a chilled plate and broken into chip form (c. 1 cm mesh). 0.1% of silica Aerosil 200 was added as a dry flow additive to aid milling. The resulting composition in chip form was ground in an impact mill to produce a powder coating composition with a particle size distribution within the range described in Example 1.

4.5% by weight, calculated on the base powder without the metallic pigment, of non-leafing sparkle aluminium pigment Hydrostab 7655 (Benda-Lutz) was added to the powder coating prepared as described above. The aluminium pigment was bonded to the powder by a mechanofusion technique, creating metallic powder coating composition M.

A powder coating composition according to the invention was produced from composition M by dry-blending, by shaking, 5% by weight (calculated on the total weight of the finished metallic powder without the additive) of Budit 222.

EXAMPLE 8

An epoxy-polyester powder coating composition was prepared according to the following formulation (parts by weight):

| | |
|---|---|
| Carboxy-functional polyester resin | 545.8 |
| Epoxy resin | 181.9 |
| Barium sulphate filler | 227.4 |
| Pigment black 6 | 1.437 |
| Buff pigment | 3.839 |
| Pigment blue 29 | 3.693 |
| Polyethylene wax | 3.821 |
| Catalyst & flow aid masterbatches | 28.5 |
| Hydroxy-functional polyester resin | 3.639 |
| | 1000.029 |

The ingredients were dry-mixed in a blender and fed into a twin-screw extruder operating at a temperature of 120° C. The extrudate was rolled flat on a chilled plate and broken into chip form (c. 1 cm mesh). 0.13% of Acematt TS 100, a silica flatting agent, was added as a dry flow additive to aid milling. The resulting composition in chip form was ground in an impact mill to produce a powder coating composition having a particle size distribution within the range described in Example 1.

1.8% by weight, calculated on the base powder without the metallic pigment, of leafing aluminium powder 2050 (Benda-Lutz) was added to the powder coating prepared as described above. The aluminium pigment was bonded to the powder by a mechanofusion technique, creating metallic powder coating composition N.

N was divided into sub-samples. Powder coating compositions according to the invention were produced from each of these sub-samples by dry-blending, by shaking, stabilising additives into the powder. The compositions of the additive-containing samples are given below (all percentages by weight, based on the metallic powder without the additive):

| | |
|---|---|
| N1 | composition N + 3% Irgacor 252LD (low dust granular version) |
| N2 | N + 3% Budit 222 |
| N3 | N + 3% Budit 229 |

These compositions were applied by electrostatic spray onto steel tin-plate test panels. The powders were stoved at 180° C. for 15 minutes to produce cured metallic-effect films of thicknesses 50–80 μm. The cured films of N1 showed visible granules of Irgacor 252LD on the surface, as this material has a particle size larger than that recommended for stabilising additives according to the invention.

Panels of the above cured coatings were placed in a humidity cabinet and subjected to condensing humidity under conditions according to BS3900 Part F2 as in Example 5. At intervals the panels were removed and the degree of attack assessed and rated according to the scale detailed in Example 1.

The rating results for N and N1–N3 after various exposure durations are shown in the following table:

| Time | Ratings | | | |
|---|---|---|---|---|
| (hours) | N | N1 | N2 | N3 |
| 3 | 0 | — | — | — |
| 4 | 3 | — | — | — |
| 5 | 4 | — | — | — |
| 6 | 5 | — | — | — |
| 24 | 5 | 1–2 | 0–1 | 0 |
| 96 | 5 | 5 | 2 | 0 |
| 120 | 5 | 5 | 2–3 | 1 |
| 144 | 5 | 5 | 3 | 1 |
| 168 | 5 | 5 | 4 | 1 |
| 190 | 5 | 5 | 5 | 1 |

As can be seen from the assessment ratings, the presence of Irgacor 252LD in N1 also impedes the rate of degradation of the metallic coating in the initial stages of exposure to humidity. Irgacor 252LD is however less effective than either Budit 222 or Budit 229 in protecting the finish, a result which may be largely attributable to the fact that it contains over 10% by volume of particles of the order of 100μ in diameter or greater, which are considered to be much too large to permit optimum performance. After eight days' exposure (190 hours), the silver finish retained its brilliance and colour only in localized spots around each granule of Irgacor 252LD, whilst the majority of the coating had completely degraded. Again Budit 229 is the most effective stabilising additive, with only a few isolated dark spots on the panel of N3 after eight days, whereas the control sample N had completely degraded after only 5–6 hours in condensing humidity.

The invention claimed is:

1. A powder coating composition which comprises a film-forming polymer, a pigment providing a metallic effect, and a stabilising additive which, in a coating formed from the composition on a substrate, inhibits degradation of the metallic pigment in the presence of oxygen and water, wherein the stabilising additive comprises at least one silicate material selected from the group consisting of: (a) materials obtained by admixture or reaction of silica or a silicate with a compound of a trivalent metal; and (b) naturally occurring or synthetic metal silicates, wherein the stabilising additive, or a silica or silicate used in embodiment (a), is surface-modified by ion exchange.

2. A powder coating composition which comprises a film-forming polymer, a pigment providing a metallic effect, and a stabilising additive which, in a coating formed from the composition on a substrate, inhibits degradation of the metallic pigment in the presence of oxygen and water, wherein at least part of the stabilising additive is incorporated by post-blending.

3. A powder coating composition as claimed in any one of claims 1 or 2, wherein the metallic pigment is in flake form.

4. A powder coating composition as claimed in any one of claims 1 or 2, wherein the metallic pigment is incorporated in the composition by dry blending.

5. A powder coating composition as claimed in claim 4, wherein the total proportion of metallic pigment(s) incorporated in the composition by dry blending is in the range of from 0.1 to 10% by weight, based on the weight of the composition without the metallic pigment(s).

6. A powder coating composition as claimed in any one of claims 1 or 2, wherein the metallic pigment is incorporated in the composition before or during homogenisation, especially in the case of a low-shear homogenisation process, and the content of metallic pigment(s) incorporated is in the range of from 0.1 to 50% by weight, based on the total weight of the composition.

7. A powder coating composition as claimed in claim 2, wherein the stabilising additive comprises at least one silicate material selected from the group consisting of: (a) materials obtained by admixture or reaction of silica or a silicate with a compound of a trivalent metal; and (b) naturally occurring or synthetic metal silicates.

8. A powder coating composition as claimed in claim 7, wherein the stabilising additive also includes an oxide selected from zinc oxide, magnesium oxide or silica.

9. A powder coating composition as claimed in claim 8, wherein the stabilising additive includes an amount of zinc oxide in the range of from 2 to 30% by weight, based on the total weight of the corrosion-inhibiting additive.

10. A powder coating composition as claimed in claim 7, wherein the trivalent metal in embodiment (a) is chromium, iron or aluminum.

11. A powder coating composition as claimed in claim 7, wherein the silicate in embodiment (b) is a silicate of a trivalent metal.

12. A powder coating composition as claimed in claim 7 in which the compound of a trivalent metal in embodiment (a) is a phosphate, fluoride, silicofluoride, chloride, sulphate or alkane carboxylate.

13. A powder coating composition as claimed in claim 7, wherein the silica in embodiment (a) is amorphous silica or a precursor thereof.

14. A powder coating composition as claimed in claim 1, wherein the ions involved in the surface modification are selected from the group consisting of calcium, zinc, cobalt, lead, strontium, lithium, barium and magnesium.

15. A powder coating composition as claimed in claim 1, wherein the stabilising additive comprises silica or alumina which has been surface-modified.

16. A powder coating composition as claimed in claim 7, wherein the ratio of silicon to metal atom is in the range of 0.2:1 to 30:1.

17. A powder coating composition as claimed in claim 2, wherein the stabilising additive comprises a metal phosphate or a metal borate.

18. A powder coating composition as claimed in claim 17, wherein the stabilising additive comprises zinc phosphate.

19. A powder coating composition as claimed in claim 18, wherein the stabilising additive comprises zinc phosphate modified with zinc molybdate and rendered organophilic by suitable surface treatment.

20. A powder coating composition as claimed in claim 17, wherein the stabilising additive comprises dicalcium phosphate dihydrate.

21. A powder coating composition as claimed in claim 17, wherein the stabilising additive comprises dimagnesium phosphate trihydrate.

22. A powder coating composition as claimed in any one of claims 1 or 2, wherein the stabilising additive has a content of stabilising anions, capable of dissolving in the presence of water.

23. A powder coating composition as claimed in claim 2, wherein the stabilising additive comprises an inorganic material.

24. A powder coating composition as claimed in claim 23, wherein the stabilising additive is substantially free of material containing organic moieties.

25. A powder coating composition as claimed in claim 2, wherein the proportion of stabilising additive(s) incorporated by post-blending is no more than 7.5% by weight.

26. A powder coating composition as claimed in any one of claims 1 or 2, wherein the total content of metallic pigment or other non-film-forming additive(s) incorporated by post-blending does not exceed 10% by weight, based on the weight of the composition without the pigment(s) and additive(s).

27. A powder coating composition as claimed in any one of claims 1 or 2, wherein the proportion of stabilising additive(s) incorporated before or during homogenisation of the composition is in the range of from 0.5 to 50% by weight, based on the total weight of the composition.

28. A powder coating composition as claimed in any one of claims 1 or 2, wherein the particle size of the or each stabilising additive or component thereof is up to 25 microns.

29. A powder coating composition as claimed in any one of claims 1 or 2, wherein the particle size of any zinc oxide included in the stabilising additive is in the range of from 0.1 to 10 microns.

30. A powder coating composition as claimed in any one of claims 1 or 2, which is a thermosetting system.

31. A powder coating composition as claimed in claim 30, which incorporates a film-forming polymer selected from carboxy-functional polyester-resins, hydroxy-functional polyester resins, epoxy resins, and functional acrylic resins.

32. A powder coating composition as claimed in any one of claims 1 or 2, wherein the metallic pigment is a coated material.

33. A powder coating composition as claimed in claim 32, wherein the coating comprises silica or other inert inorganic material.

34. A powder coating composition as claimed in claim 32, wherein the coating comprises a plastics material.

35. A powder coating composition as claimed in claim 32, wherein the metallic pigment is coated with a colouring agent.

36. A powder coating composition as claimed in any one of claims 1 or 2, wherein the metallic pigment is carried in a polymer or plasticiser which is compatible with the film-forming polymer.

37. A powder coating composition as claimed in any one of claims 1 or 2, wherein the proportion of film-forming polymer (and curing agent where appropriate) is in the range of from 25 to 99.5% by weight.

38. A process for forming a coating on a substrate, in which a composition as claimed in any one of claims 1 or 2, is applied to the substrate by a powder coating process resulting in particles of the composition adhering to the substrate, and forming the adherent particles into a continuous coating over at least part of the substrate.

39. A process as claimed in claim 38, wherein no further coating is applied to the coated substrate.

40. A coated substrate obtained by a process as claimed in claim 38.

41. A coated substrate as claimed in claim 40, wherein the substrate is a metal substrate.

42. A coated substrate as claimed in claim 40, which comprises a non-metallic material.

43. A coated substrate as claimed in claim 42, which comprises a plastics material, wood, a wood-based product, glass, glass fibre or a composite, ceramic or textile material.

44. A powder coating composition as claimed in claim 1, wherein the stabilising additive is incorporated by post-blending.

45. A powder coating composition as claimed in claim 5, wherein the range is from 0.1 to 5% by weight.

46. A powder coating composition as claimed in claim 25, wherein the proportion is no more than 5% by weight.

47. A powder coating composition as claimed in claim 28, wherein the particle size is up to 10 microns.

48. A powder coating composition as claimed in any one of claims 1 or 2, wherein the metallic pigment comprises aluminum, an aluminum alloy, stainless steel, copper, tin, bronze or brass.

49. A powder coating composition as claimed in claim 7, wherein the stabilising additive comprises zinc oxide.

50. A powder coating composition as claimed in claim 1, wherein the stabilising additive comprises zinc oxide.

51. A powder coating composition as claimed in claim 1, wherein the ion involved in the surface modification is calcium.

52. A powder coating composition as claimed in claim 17, wherein the phosphate is an ortho-phosphate, hydrogen phosphate or polyphosphate.

53. A method for preparing a powder coating composition comprising the steps of combining a film-forming polymer;

a pigment providing a metallic effect; and a stabilising additive, wherein:
- (a) in a coating formed from the composition on a substrate, the composition inhibits degradation of the metallic pigment in the presence of oxygen and water; and
- (b) the stabilising additive comprises at least one silicate material selected from the group consisting of: (i) materials obtained by admixture or reaction of silica or a silicate with a compound of a trivalent metal; and (ii) naturally occurring or synthetic metal silicates, wherein the stabilising additive, or a silica or silicate used in embodiment (i), is surface-modified by ion exchange.

54. A method for preparing a powder coating composition comprising the steps of (a) combining a film-forming polymer and a pigment providing a metallic effect; and (b) adding a stabilising additive by post-blending, wherein in a coating formed from the composition on a substrate, the composition inhibits degradation of the metallic pigment in the presence of oxygen and water.

* * * * *